(12) United States Patent
Catherin et al.

(10) Patent No.: US 6,343,518 B1
(45) Date of Patent: Feb. 5, 2002

(54) LIQUID METER WITH IMPROVED PIVOTING

(75) Inventors: Daniel Catherin, Manziat; Ludovic Ducate, Genouilleux, both of (FR)

(73) Assignee: Schlumberger Industries, S.A., Montrouge (FR)

( * ) Notice: Subject to any disclaimer, the term of this patent is extended or adjusted under 35 U.S.C. 154(b) by 0 days.

(21) Appl. No.: 09/326,399

(22) Filed: Jun. 4, 1999

Related U.S. Application Data

(63) Continuation of application No. PCT/FR97/02326, filed on Dec. 17, 1997.

(30) Foreign Application Priority Data

Dec. 19, 1996 (FR) .......................................... 96 15820

(51) Int. Cl.⁷ .............................................. G01F 1/06
(52) U.S. Cl. ................................ 73/861.92; 73/861.91; 73/861.79
(58) Field of Search ...................... 73/861.91, 861.92, 73/861.89, 861.75, 861.79, 861.83, 237, 238

(56) References Cited

U.S. PATENT DOCUMENTS

| 4,377,091 A | * | 3/1983 | DeCarlo ................... 73/861.87 |
| 5,146,789 A | * | 9/1992 | Kato et al. ............... 73/861.91 |
| 5,277,071 A | * | 1/1994 | Pieper ..................... 73/861.83 |

* cited by examiner

*Primary Examiner*—Benjamin R. Fuller
*Assistant Examiner*—Corey D. Mack
(74) *Attorney, Agent, or Firm*—Leonard W. Pojunas

(57) ABSTRACT

The invention provides a liquid meter comprising a measurement chamber in which a spinner is caused to rotate about an axis and pivots, at least at low liquid flow rates, on a support in alignment with the axis. The pivoting motion takes place via a ball that is free to rotate between two concave surfaces each having a radius of curvature that is greater than the radius of curvature of the ball. One of the concave surfaces is tied to the spinner, whereas the other surface is secured to the support.

10 Claims, 3 Drawing Sheets

LIQUID METER WITH IMPROVED PIVOTING

This application is a continuation of PCT/FR97/02326 filed Dec, 17, 19997.

The invention relates to a liquid meter having a measurement chamber in which a spinner is driven in rotation about an axis and pivots, at least at low liquid flow rates, on a support in alignment with the axis.

BACKGROUND OF THE INVENTION

Liquid meters of this type are known, e.g. as described in documents GB 437 637 and FR 2 336 666. In those meters, the pivoting motion of the vertical axis spinner is conventionally performed by means of a fine conical tip connected to the support, as in document GB 437 637, or to the axis of the spinner, as described in document FR 2 336 666, and in contact with a plane or concave surface associated with the spinner (GB 437 637) or with the support (FR 2 336 666). Contact between the conical tip and the plane or concave surface is almost point contact and enables mechanical friction to be kept small while the spinner is pivoting on its support, thereby imparting good sensitivity to the liquid meter.

In the water meter described in document FR 2 336 666, provision is made for the spinner to rise when the flow is above a certain rate, thereby separating the conical tip and the plane or concave surface, and thus reducing the risk of the tip being subjected to wear. By moving the conical tip and the surface apart, it is ensured that the point contact does not become an area contact, thereby increasing friction while pivoting.

Nevertheless, it would be advantageous to find a solution to the problem of the conical tip being subject to wear in contact with the plane or concave surface when said contact needs to continue over a long period of time.

OBJECTS AND SUMMARY OF THE INVENTION

The present invention seeks to remedy this problem by proposing a solution that is of simple design and that is very effective.

The present invention thus provides a liquid meter comprising a measurement chamber in which a spinner is caused to rotate about an axis and pivots, at least at low liquid flow rates, on a support in alignment with said axis, wherein pivoting motion takes place via a ball that is free to rotate between two concave surfaces each having a radius of curvature that is greater than the radius of curvature of the ball.

By proposing rolling point contacts between the ball and each of the concave surfaces, it is ensured that it is not always the same points that come into contact over a period of time, and thus that wear of the ball is greatly reduced compared with wear of the prior art conical tip.

Even after the spinner has been pivoting on its support for a long time, point contact is maintained, thereby guaranteeing that the initial sensitivity of the spinner is maintained.

In addition, contact between the ball and the top and bottom concave surfaces ensures that the ball is centered automatically, thereby making it possible to recenter the spinner relative to its support, and thus avoid lateral friction when the spinner is off-center.

By way of example, the axis may be vertical when the meter is disposed horizontally.

According to another characteristic of the invention, the upper limit for the radii of curvature of the concave surfaces is determined by the weight of the spinner in the liquid, with the radii of curvature increasing with increasing weight of the spinner in the liquid.

Automatic centering of the ball depends on the weight of the spinner in the liquid and on the radii of curvature of the concave surfaces.

According to a characteristic, one of the concave surfaces is tied to the spinner whereas the other surface is secured to the support.

By way of example, both concave surfaces are substantially spherical, parabolic, or elliptical in shape.

It is even possible to envisage the shapes of the two surfaces not being both of the same type. Thus, for example, one of the surfaces may be spherical while the other is elliptical. Any such combination can be taken into consideration by the person skilled in the art. For reasons of simplicity, it is preferable to select the same radius of curvature for each of the concave surfaces, but that is not a technical necessity of any kind.

Depending on whether the mean density of the spinner is greater or less than the density of the liquid, the ball is placed beneath the spinner or above it. In either of the two cases envisaged above, an axial housing may be provided in the spinner to receive the support constituted by the ball and by an axial pivot provided at one of its ends penetrating into said housing with one of the concave surfaces for coming into contact with the ball, the other concave surface being formed at the end of said axial housing of the spinner.

As a variant, in either of the cases envisaged above, provision can be made for an axial shaft secured to the spinner to penetrate into an axial housing having one of said concave surfaces formed at the end thereof, said axial shaft being provided at one of its penetrating ends with the other concave surface, the ball being disposed in said housing between said surfaces.

BRIEF DESCRIPTION OF THE DRAWINGS

Other characteristics and advantages appear from the following description given purely by way of non-limiting example, and made with reference to the accompanying drawings, in which.

DETAILED DESCRIPTION OF THE PREFERRED EMBODIMENTS

Figure 1:
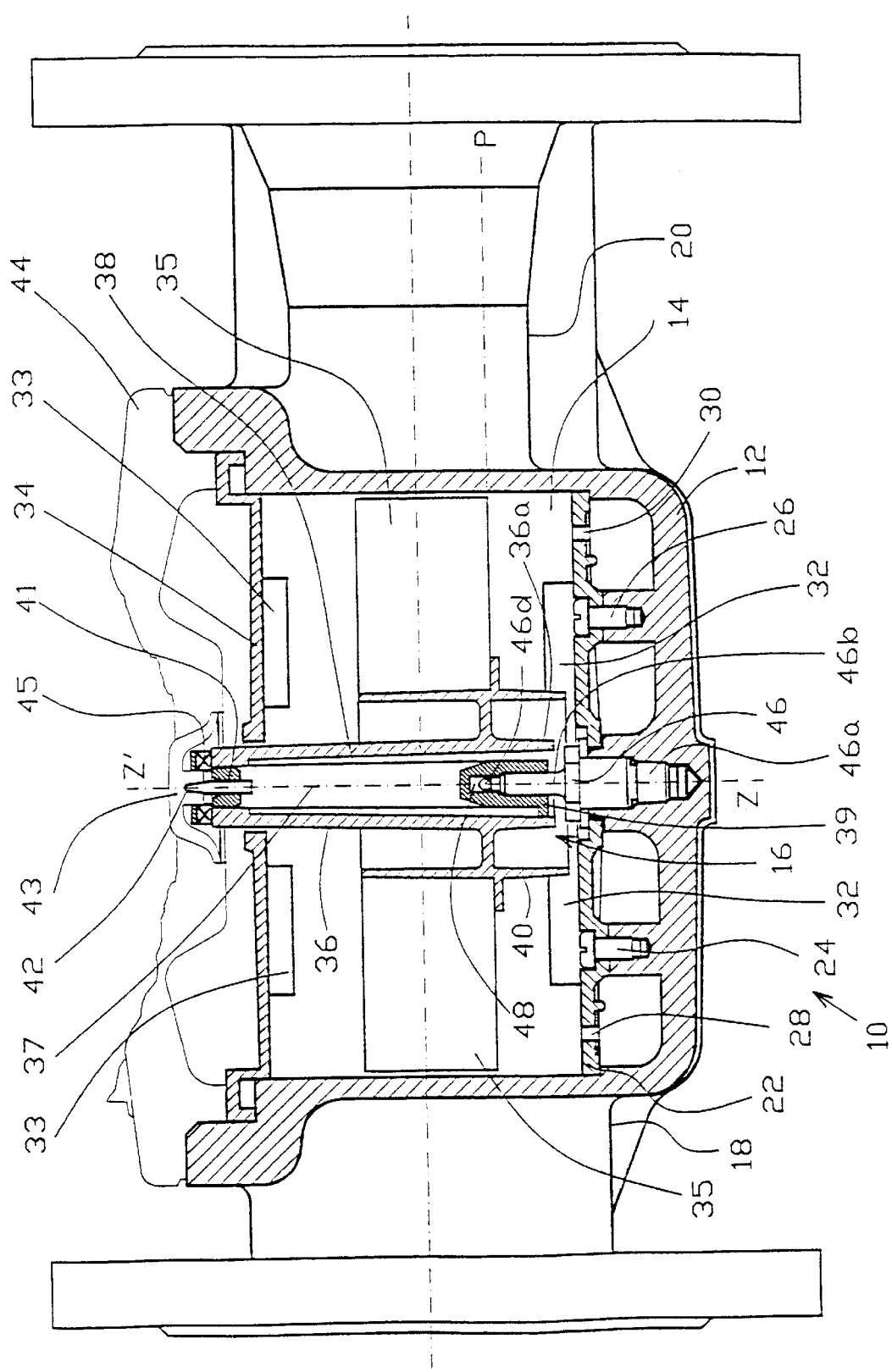
FIG. 1 is a diagrammatic longitudinal view of a measurement chamber of a water meter of the invention.

As shown in FIG. 1 and designated by general reference 10, a liquid meter, e.g. a water meter, comprises a vessel 12 in which a measurement chamber 14 is installed and fitted with a spinner 16 having a vertical axis ZZ'.

A water inlet 18 and a water outlet 20 are connected to the vessel 12 on opposite sides thereof and communicate with the measurement chamber 14 in order respectively to convey a flow of water to said chamber, thereby setting the spinner into rotation, and to remove said flow after it has passed through the measurement chamber.

The water inlet and outlet 18 and 20 are not shown in section in FIG. 1, but are shown only in the background since they are offset relative to the center of the measurement chamber. By way of example, the water inlet may have an inside diameter of 80 mm followed by a reduced inside diameter of 46 mm. The water outlet 20 may, for example, have an inside diameter of 80 mm.

The bottom portion of the measurement chamber may include a bottom plate 22 fixed by means of screws 24 and 26 to the bottom of the vessel 12 which is provided with at least two orifices 28 and 30 enabling pressure to be balanced on either side thereof, e.g. in the event of water hammer occurring. A plurality of baffles 32, e.g. four baffles, are disposed radially at 90° intervals on the pressure plate 22. In the top portion of the measurement chamber, there are also provided four other baffles 33 on the bottom face of a top plate 34.

The spinner 16 has a plurality of blades 35, e.g. seven blades, secured to a central hub 36. A substantially cylindrical internal cavity 37 is provided inside the central hub, and axial ribs 38 are formed in said cavity along the full height of said hub. A bearing-forming part 39 is engaged in the bottom portion of the hub. The central bottom portion 36a of the hub 36 is extended towards the pressure plate 22 beyond the horizontal plane P which defines the bottom portions of the blades 35. The central hub 36 also includes a portion 40 of substantially hollow cylindrical shape surrounding the central bottom portion 36a of the hub and provided with a base of annular shape situated in the plane P. The top portion of the hub 36 of the spinner 16 passes through the plate 34 and is guided in rotation by means of a pin 41 which is engaged in a housing 42 provided in a capsule-forming part 43 mounted in the center of a top plate 44 pressed against the vessel 12 and the plate 34. When the spinner moves upwards, the top portion of the pin comes into abutment against the end wall of the housing 42 in the part 43.

A portion 45 of a magnetic coupling system is provided at the top end of the hub 36 on one side of the part 44, with the other portion of said system being disposed on the other side of the part 44. The magnetic coupling system serves to transmit the rotation from the spinner to a mechanical portion connected to the counter of the meter and situated on the other side of the part 44. The counter is not shown in FIG. 1.

The spinner 16 is mounted on an axial support 46 of longitudinal shape provided at its bottom end 46a with a thread enabling it to be secured in a tapped hole provided in the bottom of the vessel 12. The top portion 46b of the axial support 46 includes a pivot that is substantially in the form of a smooth cylinder inserted in the bearing 39, and which tapers towards the top end of said support after a narrowing of its section. The inside shape of the bearing 39 reproduces the profile of the support, and therefore also has a section that reduces going towards the end wall of said bearing.

The top end of the axial support 46 has a concave surface 46c facing upwards (FIG. 2a) and designed to receive a ball 46d. The concave surface may, for example, be spherical in shape (FIG. 2a) having a radius of curvature R1 greater than the radius of curvature R2 of the ball. At the end wall of the bearing 39, a piece 48 which can be made of tungsten carbide, for example, is mounted in a housing 50 and presents a concave surface 48a that is designed to receive the ball 46d. By way of example, the concave surface 48a is spherical in shape having a radius of curvature R3 greater than the radius of curvature R2 of the ball.

By way of example, the ball has a radius R2 equal to 1.5 mm and is made of stainless steel. To ensure that the ball is in point contact with each of the concave surfaces 46c and 48a, thereby ensuring that the meter has good sensitivity, it is necessary for the radii of curvature R1 and R3 of these surfaces to differ sufficiently from the radius R2 of the ball. The minimum difference between the radii R1, R3 and the radius R2 cannot be evaluated quantitatively since it depends on the value of R2 and increases with increasing value for R2. Values can be selected for R1 and R3 by successive approximations by taking values for R1 and R3 that are greater and greater relative to R2, and by monitoring the sensitivity of the meter, each time after performing an endurance test.

The fact that the ball 46d is free to rotate between these two surfaces makes it possible to obtain two rolling point contacts, i.e. the points of contact vary over time and as a result ball wear is much less than the wear of a fine tip as used in the prior art. After the spinner 16 has been pivoting for a long time on the support 46, the bottom and top contacts between the ball and the concave surfaces will therefore continue to be of the point type, thus guaranteeing that meter sensitivity is maintained over time.

In this embodiment, the mean density of the spinner 16 is greater than the density of water. The weight of the spinner in water may be equal to 4 grams, for example, R1 and R3 may be equal to each other having a value of 2.1 mm, and the radius R2 of the ball may be 1.5 mm.

If the spinner is heavier, then the values of R1 and R3 can be considerably increased. The values of the radii R1 and R3 are determined as a function of the weight of the spinner in water in order to ensure that the ball continues to be centered automatically between these surfaces. If the weight of the spinner is not taken into account when selecting values for the radii R1 and R3, there is a risk of selecting a value that is too great for a spinner whose weight in water is too small, thus leading to the possibility of the ball moving off-center relative to its initial position while pivoting is taking place. Under such circumstances, the bearing 39 of the spinner 16 would come into contact with a generator line of the portion 46b of the support and that would give rise to non-negligible friction and thus to a reduction in the sensitivity of the meter at the flow rate in question.

It may be observed that if the surfaces coming into contact with the ball were plane instead of being concave, then regardless of the weight of the spinner in water, the self-centering phenomenon would not exist and the ball could come into abutment against the inside surface of the bearing 39, thereby giving rise to further contacts in addition to the initially-intended point contacts, thus giving rise to additional friction. Under such circumstances, this friction would add to that generated by contact between the bearing 39 of the spinner 16 and the portion 46b of the support 46.

Conversely, if the concave surfaces had almost the same radius of curvature as the ball, then the top and bottom point contacts could no longer be achieved and would be replaced by top and bottom area contacts, and possibly even lateral area contacts, thereby giving to rise to high levels of friction and thus to a drop in meter sensitivity.

It may be observed that instead of providing an insert part 48 at the end of the bearing 39, it might be possible to make do with machining or molding the surface 48a in the end wall of said bearing.

When prior art meters are being transported, they are subjected to repeated damaging shocks, and when such shocks occur the spinner strikes the fine tip of the support, thereby blunting it. The tip thus becomes worn even before being used for pivoting the spinner, so the sensitivity of the meter is degraded, even initially. With the invention, any risk of meter sensitivity being degraded is considerably reduced because there is no longer a relatively fragile fine tip but a ball, and, furthermore, the point of contact on the ball where blunting might take place is in all probability not the same as the point which will be subsequently in use for pivoting the spinner.

Also, when the water meter is used with water carrying a large amount of inorganic particles, these become deposited in the smallest recesses of the meter including, for example, where the spinner is pivoted. FIG. 2b is a simplified view on a larger scale showing the effects of clogging that takes place in the zone where a spinner pivots in a prior art meter. Since the point of contact between the fine tip 52 and the facing concave surface 54 of the spinner bearing is fixed, particles accumulate around said tip on the surface and, after operating for many hours in cloudy water, end up by forming a layer 56 which increases friction relative to the support tip, thereby affecting meter sensitivity.

In the invention, the ball 46d is free to rotate between the concave surfaces 46c and 48a, and as a result it will move a little between them under the effect of various kinds of vibration and/or the spinner lifting slightly and/or the spinner moving radially, and as a result movement of the ball will prevent inorganic particles carried by the water from adhering to said surfaces.

Figure 2A:
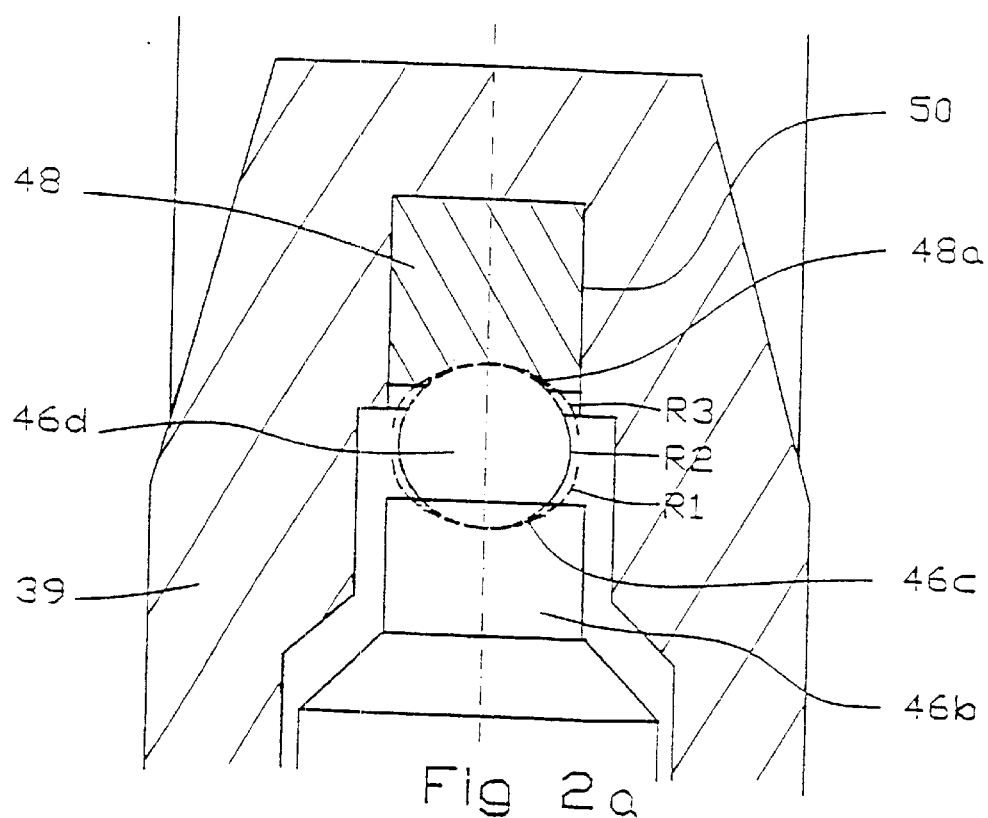
FIG. 2a is a diagrammatic view on a larger scale showing the invention.
Figure 2B:
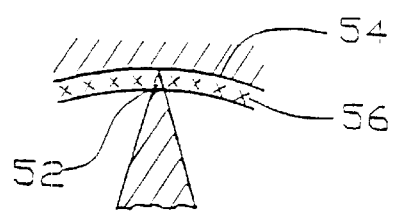
FIG. 2b is a diagrammatic view on a larger scale showing a conical tip in contact with a concave surface in accordance with the prior art and after clogging has occurred.
Figure 2C:
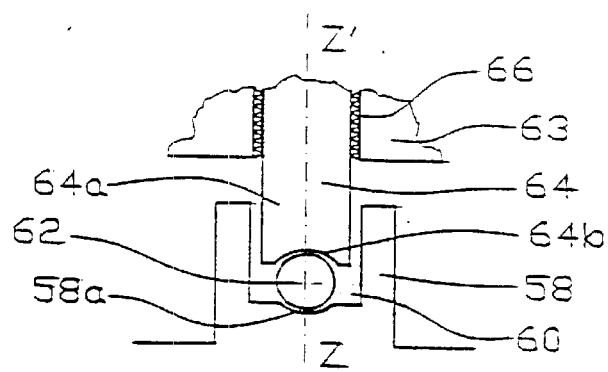
FIG. 2c is a diagrammatic view on an enlarged scale of a variant embodiment of the invention.

As shown in FIG. 2c, in a variant embodiment, a part 58 projecting from the end wall of the measurement chamber and of essentially cylindrical outside shape possess a cylindrical housing 60 with a concave surface 58a being formed in the end thereof in order to serve as a support for a ball 62. The spinner 63 which is shown in part only includes an axial shaft 64 in alignment with the axis of rotation ZZ' thereof and securely fixed thereto. The shaft 64 penetrates partially into the housing 60 and rests on the ball 62 which in turn co-operates with the concave surface 58a to constitute a support on which the spinner can pivot. The shaft 64 has a concave surface 64b at its bottom end 64a in contact with the ball. The two concave surfaces have the same characteristics as those given above with reference to FIGS. 1 and 2a.

It should be observed that when the mean density of the spinner is less than the density of water, then the dispositions shown in the embodiments of FIGS. 2a and 2c should be located above the spinner and in the opposite order to that shown on those figures, i.e. for the disposition of FIG. 2a, the surface 48a should be placed beneath the ball 46d with the ball being placed beneath the elongate part 46a,b.

Figure 3:
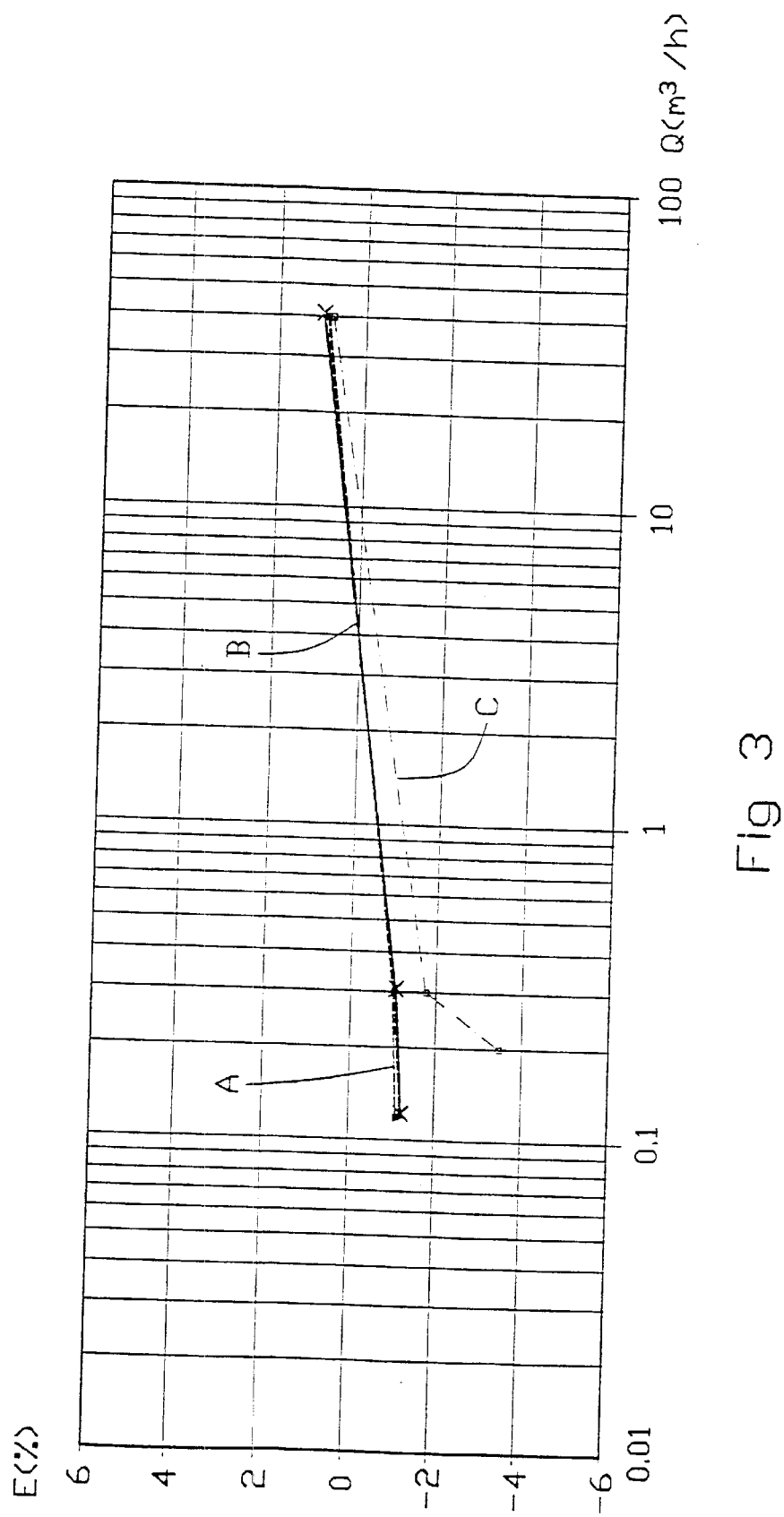
FIG. 3 is a graph of error curves as a function of flow rate for a water meter of the invention before (curve A) and after (curve B) endurance tests performed at a low flow rate.

The effectiveness of the invention is shown in FIG. 3 where two error curves A and B give error E in percentage terms obtained for the flow rate Q as measured by a water meter of nominal flow rate equal to 20 m³/h and of the kind shown in FIG. 1, respectively before and after performing an endurance test of 825 hours at a flow rate equal to 3 m³/h. That test consists in accelerating the phenomenon of pivot wear. Thus, the two curves are substantially identical which shows that the meter of the invention conserves its sensitivity regardless of flow rate and even after the spinner 16 has been pivoting for an extended period of time on the support 46.

Curve A also corresponds to the error curve obtained prior to endurance testing with a water meter of the kind shown in FIG. 1 but in which pivoting is performed not on a ball but via a fine tip in contact with a concave surface (prior art). In contrast, a third error curve, C, gives the error obtained on flow rate measured by the prior art water meter after it has been subjected to the above-mentioned test, and this curve reveals very considerable degradation in meter sensitivity.

It should be observed that the water meter described with reference to FIG. 2a operates in the manner described in European patent No. 0 170 564, i.e. above a certain value of flow rate, the spinner rises and the surface 48a is no longer in contact with the ball. With conventional meters, that makes it possible to prevent the spinner resting on the conical fine tip at high speeds of rotation, thereby limiting wear of said tip, and thus conserving good sensitivity so long as the flow rate is high. With that type of meter, the axial displacement of the spinner must be large enough to ensure that axial vibration of said spinner when in its high position does not give rise to repeated hammering between the concave surface of the spinner and the conical fine support tip since that could degrade the performance of the meter.

Since the invention considerably reduces effects of the above type, the axial displacement of the spinner can be reduced. This characteristic presents a considerable advantage. When the spinner rises above a certain value of flow rate, the curve representing error obtained on measured flow rate can present, in the vicinity of the flow rate value at which the spinner rises, a step of size that increases with increasing axial stroke of the spinner. Because of this step, errors obtained on the curve below the "lift-off flow rate" and errors obtained above said flow rate can be very different, and that has the consequence of the meter's error curve possibly presenting errors that are unacceptable at certain flow rate values within the range of the meter and in the intended application. Reducing the axial stroke of the spinner serves specifically to reduce the difference between errors obtained on the curve below and above the "lift-off flow rate", thereby improving the metrological characteristics of the meter.

The invention applies to any liquid meter having a vertical axis spinner, and in particular to a Woltmann type liquid meter in which the flow of liquid sets the spinner into rotation by penetrating into the measurement chamber from below said spinner and by leaving said chamber from above the spinner. Regardless of whether the liquid meter is of the single jet type, the multiple jet type, or the Woltmann type, the invention is equally applicable regardless of whether drive between the spinner and the counter is mechanical or by means of magnets.

The invention is applicable to any type of liquid meter, such as water meters, meters for industrial liquids, meters for liquid foodstuffs, . . . .

What is claimed is:

1. A liquid meter comprising a measurement chamber in which a spinner is caused to rotate about an axis and pivots, at least at low liquid flow rates, on a support in alignment with said axis, both the spinner and the support having a concave surface facing each other, wherein pivoting motion takes place by means of a ball that is free to rotate between said two concave surfaces, each concave surface having a radius of curvature that is greater than the radius of curvature of the ball.

2. A liquid meter according to claim 1, in which the radii of curvature of the concave surfaces have an upper limit which is determined by the weight of the spinner in the liquid, with the radii of curvature increasing with increasing weight of the spinner in the liquid.

3. A liquid meter according to claim 1, in which the concave surfaces are substantially spherical in shape.

4. A liquid meter according to claim 1, in which the concave surfaces are substantially parabolic in shape.

5. A liquid meter according to claim 1, in which the concave surfaces are substantially elliptical in shape.

6. A liquid meter according to claim 1, in which the concave surfaces have the same radius of curvature.

7. A liquid meter according to claim 1, in which both concave surfaces have the same radius of curvature.

8. A liquid meter according to claim 1, in which the ball is placed beneath the spinner when the mean density of the spinner is greater than the density of the liquid.

9. A liquid meter according to claim 1, in which an axial housing is provided in the spinner to receive the support constituted by the ball and an axial pivot which is provided at one of its ends that penetrates into said housing with one of the concave surfaces, the other concave surface being provided at the end of said axial housing.

10. A liquid meter according to claim 1, in which the spinner possesses an axial shaft, said axial shaft penetrates into an axial housing at the end of which one of the concave surfaces is formed, said axial shaft being provided at a penetrating one of its ends with the other concave surface, the ball being disposed in said housing between said surfaces.

\* \* \* \* \*